United States Patent
De Boer

(10) Patent No.: US 7,602,570 B2
(45) Date of Patent: Oct. 13, 2009

(54) MOTOR POWER CONTROLLER FOR A DISK DRIVE, DISK DRIVE COMPRISING A MOTOR POWER CONTROLLER AND METHOD FOR CONTROLLING THE MOTOR POWER OF A DISK DRIVE

(75) Inventor: Bart Michiel De Boer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 578 days.

(21) Appl. No.: 10/571,822

(22) PCT Filed: Sep. 1, 2004

(86) PCT No.: PCT/IB2004/051649

§ 371 (c)(1),
(2), (4) Date: Mar. 15, 2006

(87) PCT Pub. No.: WO2005/027115

PCT Pub. Date: Mar. 24, 2005

(65) Prior Publication Data

US 2006/0274622 A1      Dec. 7, 2006

(30) Foreign Application Priority Data

Sep. 18, 2003    (EP)    ................... 03103439

(51) Int. Cl.
*G11B 15/46*    (2006.01)
(52) U.S. Cl. ............... 360/73.01; 369/53.43; 360/73.03
(58) Field of Classification Search ............... None
See application file for complete search history.

(56) References Cited

U.S. PATENT DOCUMENTS

| | | | |
|---|---|---|---|
| 4,984,103 A | 1/1991 | Nigam | |
| 5,493,670 A | 2/1996 | Douglis et al. | |
| 5,517,649 A | 5/1996 | Mc Lean | |
| 6,097,679 A | 8/2000 | Ohtaki | |
| 6,411,457 B2 * | 6/2002 | Yamashita et al. | 360/73.03 |
| 6,914,859 B2 * | 7/2005 | Miyamoto | 369/47.11 |

FOREIGN PATENT DOCUMENTS

| | | |
|---|---|---|
| WO | 9510110 | 5/1995 |
| WO | 0115161 A1 | 3/2001 |
| WO | 03052758 A1 | 6/2003 |

OTHER PUBLICATIONS

ISR: PCT/IB04/051649, Dec. 7, 2004.
Written Opinion: PCT/IB04/051649, Dec. 7, 2004.

* cited by examiner

*Primary Examiner*—Jason C Olson

(57) ABSTRACT

A motor power controller for a disk drive includes at least two operation states. In a first operation state, the disk drive motor is running continuously, and in a second operation state, the motor is spun up at the beginning of each data operation and spun down at the end of each data operation. The motor power controller transitions the disk drive from the first to the second operation state when a time interval is longer than a predetermined period of time without any data requests is determined. Further, the motor power controller transitions the disk drive from the second to the first operation state when a predetermined number of time intervals between consecutive data requests are all smaller than the predetermined period of time.

16 Claims, 2 Drawing Sheets

MOTOR POWER CONTROLLER FOR A DISK DRIVE, DISK DRIVE COMPRISING A MOTOR POWER CONTROLLER AND METHOD FOR CONTROLLING THE MOTOR POWER OF A DISK DRIVE

The present invention relates to a motor power controller for a disk drive. Further on, the present invention relates to a disk drive comprising a motor power controller and to a method for controlling the motor power of a disk drive.

For the following description, a disk drive shall be defined as an optical drive like a CD-ROM drive or a magnetic drive like a diskette drive or a magneto-optical drive.

Portable computers like laptop computers or portable audio/video systems like DVD players or other portable devices operate usually on battery power. The duration at which e.g. a portable device operates before its battery must be recharged is governed by the level of current which is drawn from the battery, and the total charge the battery is capable of storing. In order to provide a portable device which operates for a long time period before its battery must be recharged, development efforts have focused both on maximizing the total charge carried by such a battery, and on minimizing the current drawn from the battery or on minimizing power consumption by the portable device.

As more and more efficient logic and displays become available, an important factor in determining battery life is the disk drive of the portable device. For that, in order to maximize battery life-time, the efficiency of the disk drive has to be improved.

The U.S. Pat. No. 5,517,649 discloses an adaptive power management for hard disk drives. In this prior art document there is described a method of managing the power consumed by a hard disk drive, whereby in a first step the work load placed on the hard disk drive is measured. The next step is to determine the average power consumed in the disk drive in the active state and in a lower power state for a series of wait times. Then, the total average power consumed by the disk drive for both states for a series of wait times is determined. The next step is to determine the wait time at which the total average power consumed by the disk drive is minimum. The final step is to set the wait time at which the disk drive operates to the previously determined minimum wait time.

The U.S. Pat. No. 5,493,670 discloses a method for managing the power consumed by a disk drive in a portable laptop computer. According to the U.S. Pat. No. 5,493,670 the power in a laptop computer is conserved by spinning down the disk immediately when there is inactivity if the next access will likely occur more than a number of seconds in the future, for example the next access will likely occur far enough in the future for the system to save power by spinning down the disk. According to the method described in this prior art document, the power system spins down a hard disk drive when it has not been accessed after a predetermined length of time. A decision to spin down the disk is made by a computer in response to the past history of the disk activity. The past history of disk activity is also used to adjust the threshold.

Other methods for controlling power consumption of a disk drive in a portable computer are disclosed in the U.S. Pat. No. 6,097,679 and in the International PCT Patent Application WO 01/15161 A1.

The present invention provides a motor power controller for a disk drive, especially for a disk drive of a portable device, comprising means defining at least two operation states of said disk drive, a first operation state running a motor of said disk drive continuously, and a second operation state spinning said motor up at the beginning of each data operation and spinning said motor down at the end of each data operation; comprising means transitioning said disk drive from said first operation state to said second operation state when a time interval being longer than a predetermined period of time without any data requests is determined; further comprising means transitioning said disk drive from said second operation state to said first operation state when a predetermined number of time intervals between consecutive data requests are determined all or each of them being smaller than said predetermined period of time.

The motor power controller according to the present invention minimizes the motor energy consumption of the disk drive while the disk drive needs no information or knowledge about the application running, the buffer size or the data request patterns of the portable device to which the disk drive is connected or which the disk drive is part of. The motor power controller according to the present invention is simple and does not increase communications between the disk drive and the portable device or application running thereon.

In accordance with a preferred embodiment of the invention the motor power controller comprises means calculating said predetermined period of time from an energy consumption and/or a power consumption of said disk drive.

The present invention relates to a motor power controller for a disk drive, especially for a portable optical drive.

Figure 1:
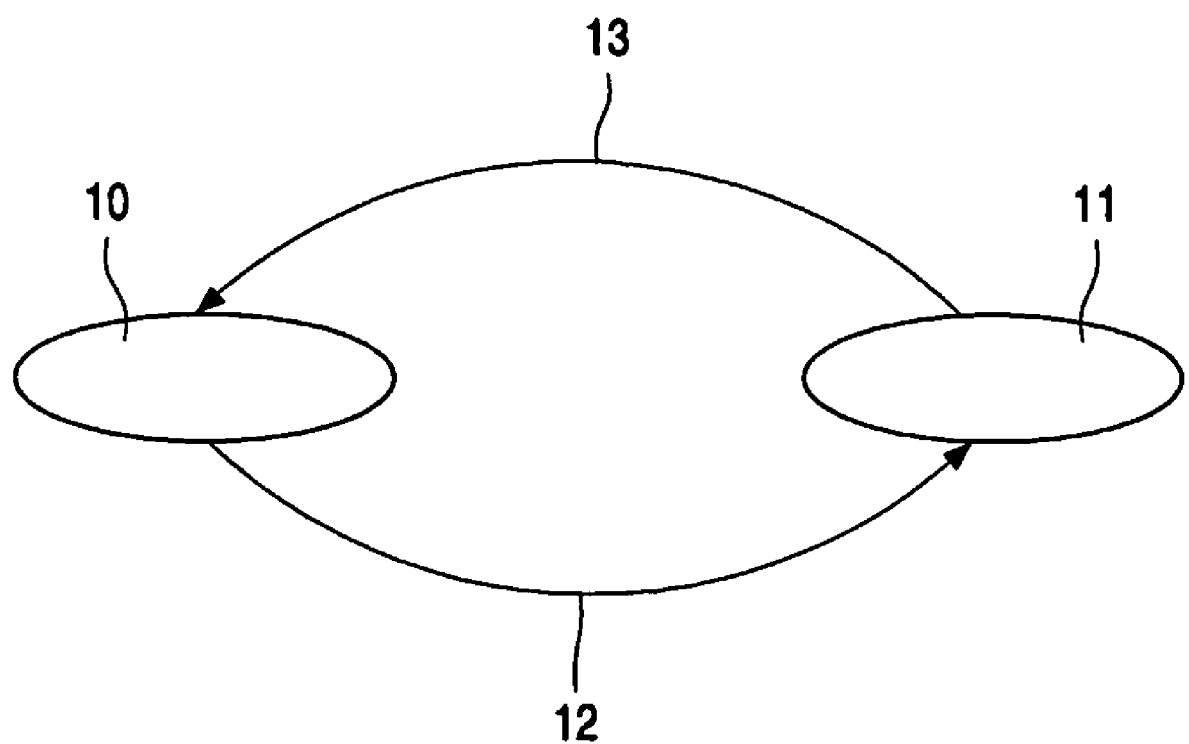
FIG. 1 shows a state diagram of disk drive motor controller according to the present invention.

According to the present invention, the motor power controller comprises means defining at least two operation states of said disk drive. FIG. 1 shows a so-called state diagram of the disk drive motor controller showing two operational states, namely a first operation state 10 and a second operation state 11. In the first operation state 10 a motor of said disk drive is running continuously also during the time when no data operation is being carried out. The time when no data operation is being carried out is hereinafter called buffer phase. During said second operation state 11 the motor spins up at the beginning of each data operation, namely each read and/or write operation, and spins down at the end of each read and/or write operation. During this second operation state 11 the disk drive motor is not running during the buffer phase. The first operation state 10 is also called "continuous-state" and the second operation state 11 is also called "spin up/down-state" or "default-state".

It should be noted, that the spinning-down of said motor at the end of each data operation during the second operation state 11 can be performed passively or actively. The phrase "spinning said motor down" is not directed to only one of these two options. The phrase "spinning said motor down" has to be understood in a way that both options fall within the scope of this phrase.

The motor power controller according to the present invention comprises means transitioning the disk drive from the first operation state 10 to the second operation state 11 and from the second operation state 11 to the first operation state 10. The arrow 12 in FIG. 1 illustrates the transition from the first operation state 10 to the second operation state 11. The arrow 13 in FIG. 1 illustrates the transition from the second operation state 11 to the first operation state 10.

According to the present invention, the transition from the first operation state 10—the so-called "continuous-state"—to the second operation state 11—the so-called "spin up/down-state"—takes place, when a time interval longer or larger than a predetermined period of time is determined, without any read and/or write requests occurring during this time interval. This indicates that the portable device, especially the application running thereon, has stopped streaming or that more buffer space has become available. With increasing buffer space the buffer phase increases. Under this condition it is more efficient to allow a motor of a disk drive to stop during the buffer phase and to spin up again before the next read and/or write operation.

The transition from the second operation state 11—the so-called "spin up/down-state"—to the first operation state 10—the so-called "continuous-state"—takes place when a predetermined number a of time intervals between consecutive data requests are determined all being smaller than said predetermined period of time. This indicates that an application with a small buffer size is streaming data to and/or from the disk drive. As more data requests at roughly the same interval can be expected during streaming, it is more energy efficient to have the motor running continuously during the buffer phase.

In the most simple embodiment the predetermined number of time intervals between consecutive data requests could be chosen as α=1. However, it is more efficient and reliable to choose α=3. When α=3 is chosen, the transition from the second operation state 11—the so-called "spin up/down-state"—to the first operation state 10—the so-called "continuous-state"—takes only place when three consecutive time intervals between consecutive data requests are determined, whereby each of the three time intervals has to be smaller than said predetermined period of time. In case only two of the three time intervals would be smaller than said predetermined period, the transition would not take place.

The present invention provides a very simple solution for minimizing the power consumption in a portable or noneportable disk drive without increasing communications between the disk drive and the portable device or the application running thereon.

Preferably, the motor power controller comprises means calculating said predetermined period of time which is used as criteria for the transitioning processes from the energy consumption and the power consumption of the disk drive motor. The invention therefore needs no information about the portable device or the application running thereon.

When the phrase "motor" is used in connection with energy or power consumption, it should be noted this could relate to the energy or power consumption of the motor itself and/or the energy or power consumption of a motor driver and/or the energy or power consumption of motor driver control circuits.

For a drive running in a so-called CLV (constant linear velocity) mode, the bit rate during a read and/or write operation is not dependent on the radius of the disk, because of the fact that the motor rotation frequency or motor rotation speed increases with decreasing disk radius. For a drive running in said CLV mode, the predetermined period of time is calculated from the energy consumption of said drive used for spinning up the disk drive motor and from the power consumption of the disk drive motor during continuous operation of said disk drive, using the following formula:

$$t_{CLV} = \frac{E_{spin-up}(r)}{P_{continuous}(r)} + t_{active};$$

wherein $t_{CLV}$ is the predetermined period of time for a disk drive operated in the CLV mode;

$E_{spin-up}$ is the energy consumption of said disk drive used for spinning the disk drive motor up;

$P_{continuous}$ is power consumption of said disk drive motor used for spinning the disk when the disk drive is in continuous operation, also during the buffer phase;

r is the disk radius;

and wherein $t_{active}$ is the time at which said disk drive is active during a data operation.

For a disk drive operated in the CLV mode $E_{spin-up}$ and $P_{continuous}$ are a function of the disk radius r. The time $t_{active}$ is a constant for a disk drive operated in the CLV mode, whereby $$t_{active} = t_{initialize} + t_{search} + t_{read/write}$$

meaning that $t_{active}$ can be calculated from the time $t_{initialize}$ used to initialize the optics of the disk drive, from the time $t_{search}$ used for search operations and from the time $t_{read/write}$ used for read and write operations. It is also possible, that $t_{active}$ is only a function of $t_{read/write}$ for applications for which no search and initialization operations are necessary.

For a drive running in a so-called CAV (constant angular velocity) mode the bit rate during a read and/or write operation is dependent on the radius of the disk and the predetermined period of time is calculated from the energy consumption of said drive used for spinning up the disk drive motor and from the power consumption of the disk drive motor during continuous operation of said disk drive, using the following formula:

$$t_{CAV} = \frac{E_{spin-up}}{P_{continuous}} + t_{active}(r);$$

wherein $t_{CAV}$ is the predetermined period of time for a disk drive operated in the CAV mode.

For a disk drive operated in the CAV mode $E_{spin-up}$ and $P_{continuous}$ are constant. The time $t_{active}$ is a function of the disk radius r, as $t_{read/write}$ is a function of the disk radius r, for a given amount of data to be accessed. For a disk drive operated in the CAV mode $t_{active}$ can be calculated as follows:

$$t_{active}(r) = t_{initialize} + t_{search} + t_{read/write}(r)$$

For applications for which no search and initialization operations are necessary, $t_{active}(r)$ is only a function of $t_{read/write}(r)$.

In the CLV and the CAV mode, the radius of the last access to the disk drive can be used for the calculation of the predetermined period of time $t_{CLV}$ or $t_{CAV}$. The best result can be achieved when consecutive data request are for data from about the same radius, e.g. when streaming a large contiguous file.

Figure 2:
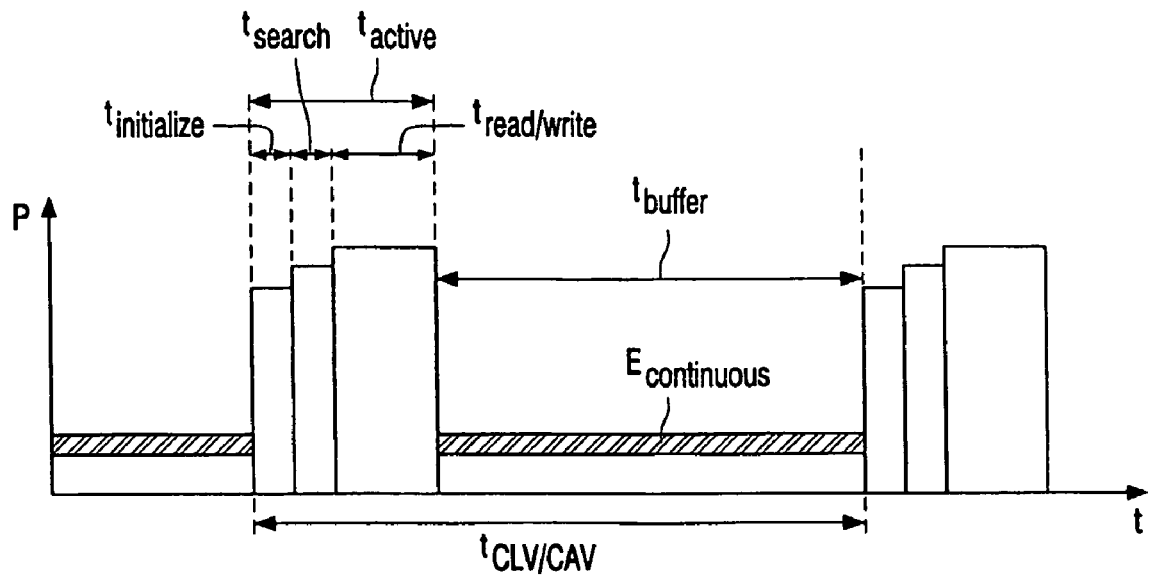
FIG. 2 shows a diagram illustrating the power and energy consumption of the disk drive during the first operation state which is also called "continuous-state"
Figure 3:
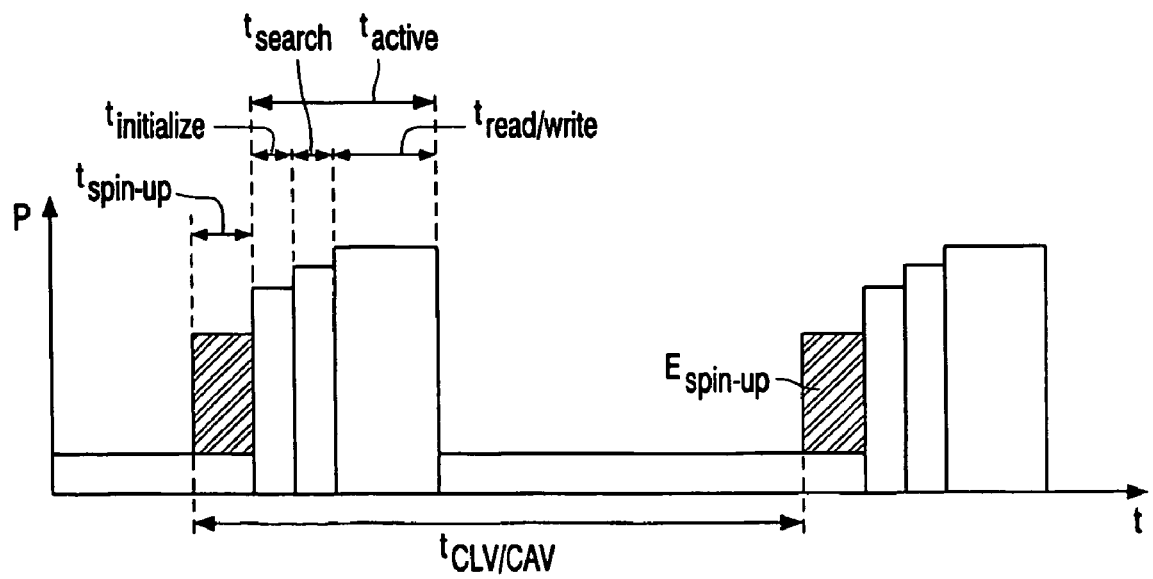
FIG. 3 shows a diagram illustrating the power and energy consumption of the disk drive during the second operation state which is also called "spin up/down-state".

FIG. 2 shows a diagram illustrating the power consumption P of the disk drive over the time t during the first operation state 10, FIG. 3 shows a diagram illustrating the power consumption P of the disk drive during the second operation state 11. The power or energy consumption during $t_{active}$ is for both operations states the same. For the first operation state 10

("continuous-state", see FIG. 2) the energy consumption $E_{continuous}$ used by the motor during buffer phase in the continuous mode is illustrated by a hatched rectangle. The duration of buffer phase is characterized by the time $t_{buffer}$, whereby:

$$E_{continuous} = P_{continuous} * t_{buffer}$$

For the second operation state 11 "spin up/down-state", see FIG. 3) the energy consumption $E_{spin-up}$ of the motor is also illustrated by a hatched rectangle. The duration of the spin-up phase of the motor is characterized by the time $t_{spin-up}$ whereby:

$$E_{spin-up} = P_{spin-up} * t_{spin-up}.$$

The predetermined period of time $t_{CLV}$ or $t_{CAV}$ used as criteria for the transitioning of the disk drive from the first operation state 10 to the second operation state 11 and from the second operation state 11 to the first operation state 10 is chosen in a way that the energy consumption $E_{continuous}$ and the energy consumption $E_{spin-up}$ illustrated by the hatched rectangles in FIGS. 2 and 3 are equal.

The above described motor power controller and method is preferably part of a drive, especially of a portable optical disk drive.

The present invention can be used in all devices incorporating a disk drive, especially an optical disk drive, e.g. in audio/video systems, in laptop computers and the like.

The invention claimed is:

1. A motor power controller for a disk drive comprising:
    means for defining at least two operation states of said disk drive, a first operation state running a motor of said disk drive continuously, and a second operation state spinning said motor up at a beginning of each data operation and spinning said motor down at an end of the each data operation;
    means for transitioning said disk drive from said first operation state to said second operation state when a time interval being longer than a predetermined period of time without any data requests is determined; and
    means for transitioning said disk drive from said second operation state to said first operation state when a predetermined number of time intervals between consecutive data requests are determined all or each of them being smaller than said predetermined period of time.

2. The motor power controller according to claim 1, further comprising calculating means for calculating said predetermined period of time from an energy consumption and/or a power consumption of said disk drive.

3. A motor power controller for a disk drive comprising:
    means for defining at least two operation states of said disk drive, a first operation state running a motor of said disk drive continuously, and a second operation state spinning said motor up at a beginning of each data operation and spinning said motor down at an end of the each data operation;
    means for transitioning said disk drive from said first operation state to said second operation state when a time interval being longer than a predetermined period of time without any data requests is determined;
    means for transitioning said disk drive from said second operation state to said first operation state when a predetermined number of time intervals between consecutive data requests are determined all or each of them being smaller than said predetermined period of time; and
    calculating means calculate for calculating said predetermined period of time from an energy consumption of said disk drive used for spinning said disk drive motor up and from a power consumption of said disk drive motor during continuous operation of said disk drive.

4. A motor power controller for a disk drive comprising:
    means for defining at least two operation states of said disk drive, a first operation state running a motor of said disk drive continuously, and a second operation state spinning said motor up at a beginning of each data operation and spinning said motor down at an end of the each data operation;
    means for transitioning said disk drive from said first operation state to said second operation state when a time interval being longer than a predetermined period of time without any data requests is determined;
    means for transitioning said disk drive from said second operation state to said first operation state when a predetermined number of time intervals between consecutive data requests are determined all or each of them being smaller than said predetermined period of time; and
    calculating means for calculating said predetermined period of time;
    wherein the disk drive is operated at a CLV (Constant Linear Velocity) mode, and wherein said calculating means calculate said predetermined period of time using the following formula:

$$t_{CLV} = \frac{E_{spin-up}(r)}{P_{continuous}(r)} + t_{active};$$

wherein $t_{CLV}$ is the predetermined period of time;
$E_{spin-up}$ is the energy consumption of said disk drive used for spinning the disk drive motor up;
$P_{continuous}$ is power consumption of said disk drive motor used for spinning the disk when the disk drive is in continuous operation, also during the buffer phase;
$t_{active}$ is the time at which said disk drive is active during a data operation;
r is the disk radius.

5. A motor power controller for a disk drive comprising:
    means for defining at least two operation states of said disk drive, a first operation state running a motor of said disk drive continuously, and a second operation state spinning said motor up at a beginning of each data operation and spinning said motor down at an end of the each data operation;
    means for transitioning said disk drive from said first operation state to said second operation state when a time interval being longer than a predetermined period of time without any data requests is determined;
    means for transitioning said disk drive from said second operation state to said first operation state when a predetermined number of time intervals between consecutive data requests are determined all or each of them being smaller than said predetermined period of time; and
    calculating means for calculating said predetermined period of time;
    wherein the disk drive is operated at a CAV (Constant Angular Velocity) mode, and wherein said calculating means calculate said predetermined period of time using the following formula:

$$t_{CAV} = \frac{E_{spin-up}}{P_{continuous}} + t_{active}(r);$$

wherein $t_{CAV}$ is the predetermined period of time;
$E_{spin-up}$ is the energy consumption of said disk drive used for spinning the disk drive motor up;
$P_{continuous}$ is power consumption of said disk drive motor used for spinning the disk when the disk drive is in continuous operation, also during the buffer phase;
$t_{active}$ is the time at which said disk drive is active during a data operation;
r is the disk radius.

6. The motor power controller according to claim 1, wherein said data operations are read and/or write operations.

7. A disk drive comprising including a motor power controller, said motor power controller comprising:
means for defining at least two operation states of said disk drive, a first operation state running a motor of said disk drive continuously, and a second operation state spinning said motor up at a beginning of each data operation and spinning said motor down at an end of the each data operation;
means for transitioning said disk drive from said first operation state to said second operation state when a time interval being longer than a predetermined period of time without any data requests is determined; and
means for transitioning said disk drive from said second operation state to said first operation state when a predetermined number of time intervals between consecutive data requests are determined all or each of them being smaller than said predetermined period of time.

8. The disk drive according to claim 7, further comprising calculating means for calculating said predetermined period of time from an energy consumption and/or a power consumption of said disk drive.

9. A disk drive including a motor power controller, said motor power controller comprising:
means for defining at least two operation states of said disk drive, a first operation state running a motor of said disk drive continuously, and a second operation state spinning said motor up at a beginning of each data operation and spinning said motor down at an end of the each data operation;
means for transitioning said disk drive from said first operation state to said second operation state when a time interval being longer than a predetermined period of time without any data requests is determined;
means for transitioning said disk drive from said second operation state to said first operation state when a predetermined number of time intervals between consecutive data requests are determined all or each of them being smaller than said predetermined period of time; and
calculating means for calculating said predetermined period of time from an energy consumption of said disk drive used for spinning said disk drive motor up and from a power consumption of said disk drive motor during continuous operation of said disk drive.

10. A method for controlling a motor power of a drive comprising the acts of:
defining at least two operation states of said disk drive, a first operation state running a motor of said disk drive continuously, and a second operation state spinning said motor up at a beginning of each data operation and spinning said motor down at an end of each data operation;
transitioning said disk drive from said first operation state to said second operation state when a time interval being longer than a predetermined period of time without any data requests is determined; and
transitioning said disk drive from said second operation state to said first operation state when a predetermined number of time intervals between consecutive data requests are determined all or each of them being smaller than said predetermined period of time.

11. The method according to claim 10, further comprising the act of calculating said predetermined period of time from an energy consumption and/or a power consumption of said disk drive.

12. A method for controlling a motor power of a disk drive comprising the acts of:
defining at least two operation states of said disk drive, a first operation state running a motor of said disk drive continuously, and a second operation state spinning said motor up at a beginning of each data operation and spinning said motor down at an end of each data operation;
transitioning said disk drive from said first operation state to said second operation state when a time interval being longer than a predetermined period of time without any data requests is determined;
transitioning said disk drive from said second operation state to said first operation state when a predetermined number of time intervals between consecutive data requests are determined all or each of them being smaller than said predetermined period of time; and
calculating said predetermined period of time from an energy consumption of said disk drive used for spinning said disk drive motor up and from a power consumption of said disk drive motor during continuous operation of said disk drive.

13. A method for controlling a motor power of a disk drive comprising the acts of:
defining at least two operation states of said disk drive, a first operation state running a motor of said disk drive continuously, and a second operation state spinning said motor up at a beginning of each data operation and spinning said motor down at an end of each data operation;
transitioning said disk drive from said first operation state to said second operation state when a time interval being longer than a predetermined period of time without any data requests is determined;
transitioning said disk drive from said second operation state to said first operation state when a predetermined number of time intervals between consecutive data requests are determined all or each of them being smaller than said predetermined period of time;
operating the disk drive at a CLV (Constant Linear Velocity) mode; and
calculating said predetermined period of time using the following formula:

$$t_{CLV} = \frac{E_{spin-up}(r)}{P_{continuous}(r)} + t_{active};$$

wherein $t_{CLV}$ is the predetermined period of time;
$E_{spin-up}$ is the energy consumption of said disk drive used for spinning the disk drive motor up;

$P_{continuous}$ is power consumption of said disk drive motor used for spinning the disk when the disk drive is in continuous operation, also during the buffer phase;

$t_{active}$ is the time at which said disk drive is active during a data operation;

r is the disk radius.

14. A method for controlling a motor power of a disk drive comprising the acts of:

defining at least two operation states of said disk drive, a first operation state running a motor of said disk drive continuously, and a second operation state spinning said motor up at a beginning of each data operation and spinning said motor down at an end of each data operation;

transitioning said disk drive from said first operation state to said second operation state when a time interval being longer than a predetermined period of time without any data requests is determined;

transitioning said disk drive from said second operation state to said first operation state when a predetermined number of time intervals between consecutive data requests are determined all or each of them being smaller than said predetermined period of time;

operating the disk drive at a CAV (Constant Angular Velocity) mode; and calculating said predetermined period of time using the following formula:

$$t_{CAV} = \frac{E_{spin-up}}{P_{continuous}} + t_{active}(r);$$

wherein $t_{CAV}$ is the predetermined period of time;

$E_{spin-up}$ is the energy consumption of said disk drive used for spinning the disk drive motor up;

$P_{continuous}$ is power consumption of said disk drive motor used for spinning the disk when the disk drive is in continuous operation, also during the buffer phase;

$t_{active}$ is the time at which said disk drive is active during a data operation;

r is the disk radius.

15. The method according to claim 10, wherein said data operations are read and/or write operations.

16. A controller for a disk drive, wherein the controller is configure to:

define at least two operation states of said disk drive, a first operation state running a motor of said disk drive continuously, and a second operation state spinning said motor up at a beginning of each data operation and spinning said motor down at an end of the each data operation;

transition said disk drive from said first operation state to said second operation state when a time interval being longer than a predetermined period of time without any data requests is determined;

transition said disk drive from said second operation state to said first operation state when a predetermined number of time intervals between consecutive data requests are determined all or each of them being smaller than said predetermined period of time; and calculate said predetermined period of time from an energy consumption of said disk drive used for spinning said disk drive motor up and from a power consumption of said disk drive motor during continuous operation of said disk drive.

* * * * *